United States Patent [19]

Levy

[11] Patent Number: 5,465,154
[45] Date of Patent: Nov. 7, 1995

[54] OPTICAL MONITORING OF GROWTH AND ETCH RATE OF MATERIALS

[76] Inventor: Karl B. Levy, 19050 Dagmar Dr., Saratoga, Calif. 95070

[21] Appl. No.: 632,413

[22] Filed: Dec. 21, 1990

Related U.S. Application Data

[63] Continuation of Ser. No. 348,191, May 5, 1989, abandoned.

[51] Int. Cl.[6] .......................... H01L 21/306; B44C 1/22
[52] U.S. Cl. ................ 356/382; 156/626.1; 156/644.1; 156/662.1; 156/345; 356/381; 356/357
[58] Field of Search ............................ 356/381, 382, 356/357; 156/626, 627, 644.1, 345, 662.1; 204/192.33

[56] References Cited

U.S. PATENT DOCUMENTS

| | | | |
|---|---|---|---|
| 4,510,605 | 4/1985 | George et al. | 372/23 |
| 4,573,465 | 3/1986 | Sugiyama et al. | 123/303.1 |
| 4,618,262 | 10/1986 | Maydan et al. | 356/357 |
| 4,637,027 | 1/1987 | Shirasaki et al. | 372/27 |
| 4,660,205 | 4/1987 | Harter et al. | 372/18 |
| 4,660,979 | 4/1987 | Muething | 356/357 |
| 4,680,084 | 7/1987 | Heimann et al. | 156/626 |
| 4,747,110 | 5/1988 | Takahashi et al. | 372/50 |
| 4,751,706 | 6/1988 | Rohde et al. | 372/23 |
| 4,767,495 | 8/1988 | Nishioka | 156/626 |
| 4,838,987 | 6/1989 | Dobson | 156/626 |
| 4,975,141 | 12/1990 | Greco et al. | 156/626 |

OTHER PUBLICATIONS

M. Born & E. Wolf, *Principles of Optics*, Pergamon Press, Fifth Edition, 1975, Chap. 1.

*Primary Examiner*—William A. Powell
*Attorney, Agent, or Firm*—Birgit E. Morris; Thomas Schneck

[57] ABSTRACT

A reflective method for monitoring the etch rate or growth rate of a material, such as a semiconductor material, that may be initially at least partly covered by another layer of a different material. An aperture in the overlying material is formed to expose a portion of the surface of the layer to be etched or grown, and a monochromatic light beam is directed at the exposed surface to form a signal which can be used to monitor the processing of the material.

5 Claims, 2 Drawing Sheets

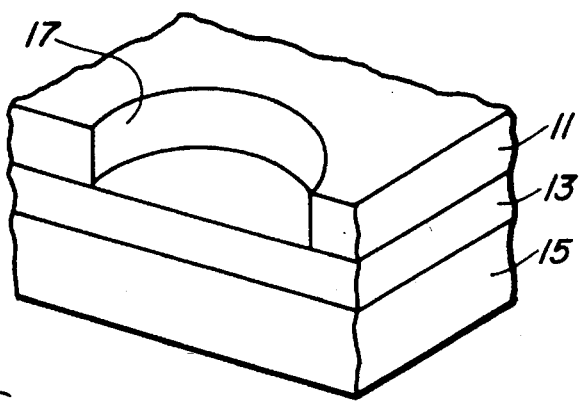
FIG._1.
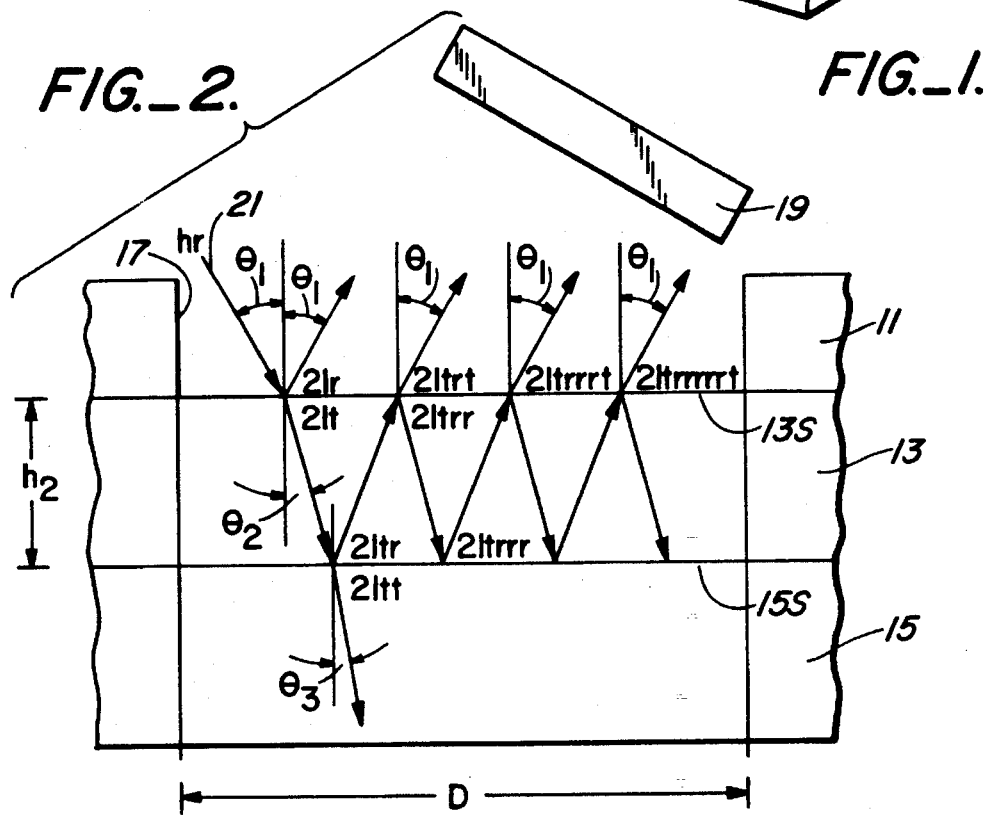
FIG._2.
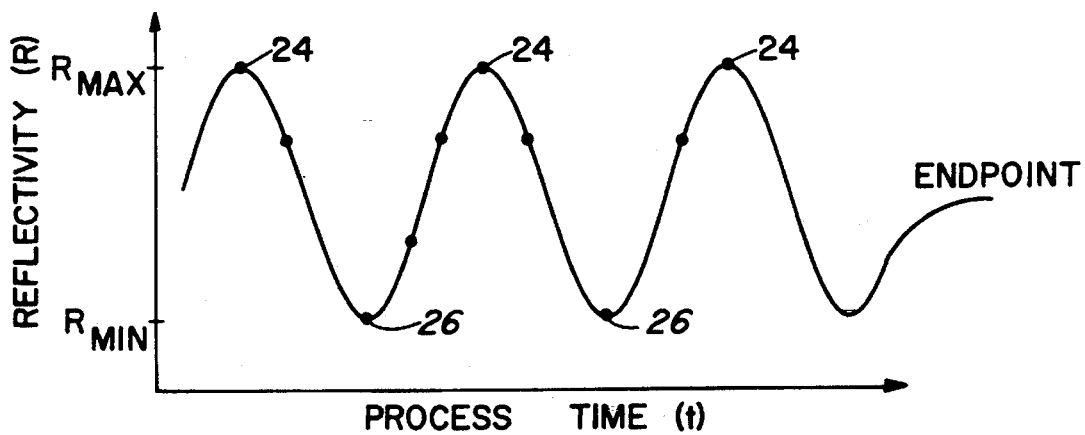
FIG._3.

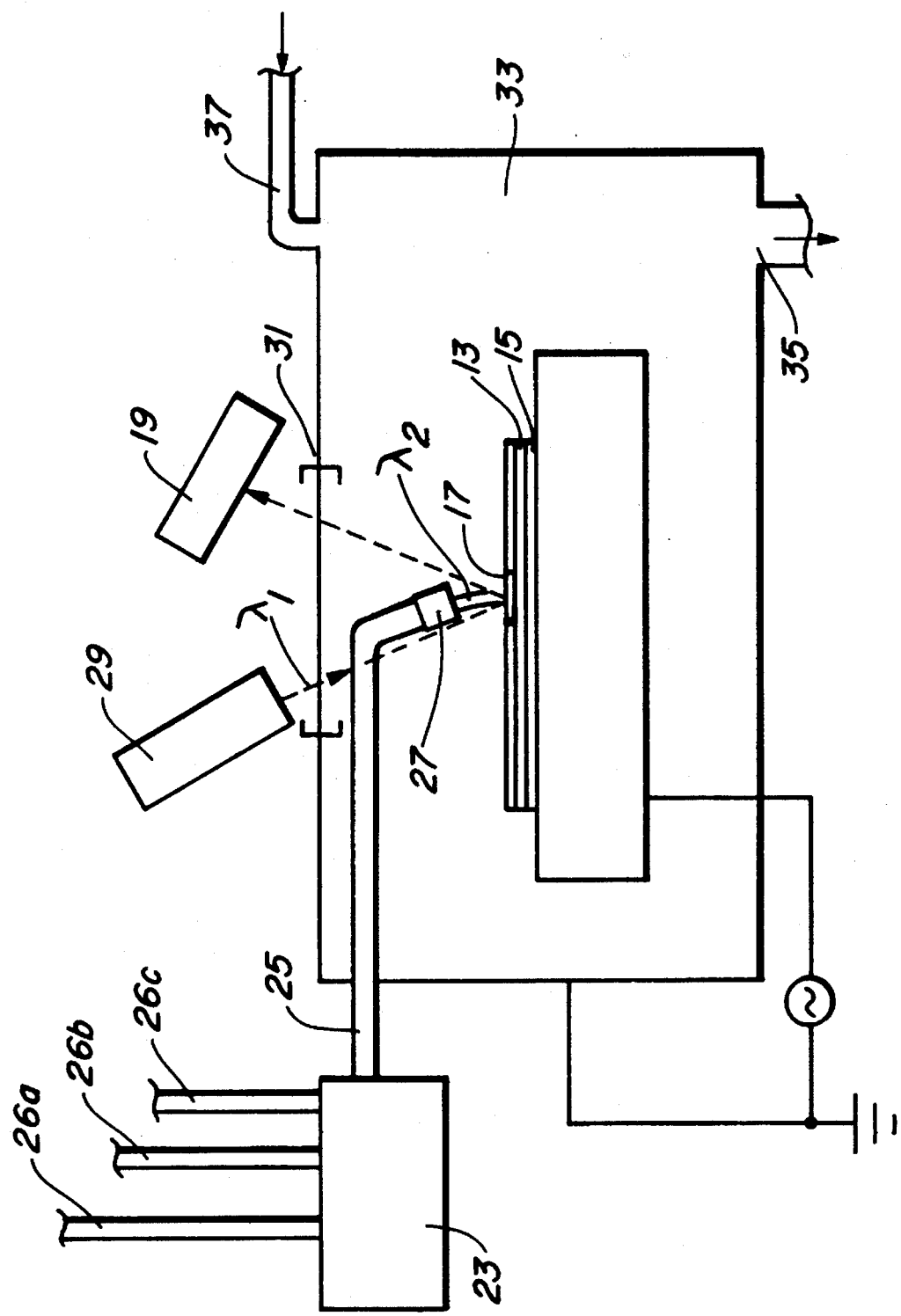
FIG._4.

OPTICAL MONITORING OF GROWTH AND ETCH RATE OF MATERIALS

This is a continuation of application Ser. No. 07/348,191 filed on May 5, 1989, now abandoned.

FIELD OF THE INVENTION

This invention relates to optical process monitoring during the fabrication of multi-layer semiconductor structures and more particularly to interferometric monitoring of the rate of growth or removal of layers during the fabrication of multi-layer integrated circuit structures.

BACKGROUND OF THE INVENTION

Fabrication of semiconductor integrated circuits involves, among other things, repeated application of four basic fabrication steps: masking, etching, layer formation through deposition or growth, and doping. Presently, etching to remove part or all of a layer of semiconductor material is performed by wet etching, using chemicals, and by dry etching using ions, a plasma or reactive dry chemistry. Dry etching has developed most recently and is especially favored where sharply defined, anisotropic profiles are required. However, even where a dry etchant with high selectivity is used to remove a given layer, some of the underlying material can be etched away in the process, which is often undesirable. As the characteristic sizes of integrated circuit geometries are reduced below 1 micron, some of the scaled structural features of such circuits become highly sensitive to even a small amount of overetching or excessive growth. Similarly, the thickness of a grown layer of semiconductor material must be controlled closely if threshold voltages and other circuit parameters are to be prescribed with any degree of confidence in these micron-size or sub-micron-size circuit geometries. Thus, accurate monitoring of the present thickness of a layer of semiconductor material that is being etched or grown, and unambiguous identification of the end point of such a process, is important for semiconductor fabrication.

One approach to end point detection of an etching process requires monitoring the composition of gas adjacent to the etched layer for the absence of, or substantially reduced concentration of, the etched material or its known compounds, through laser-induced fluorescence or a similar process. The end point of this process occurs when the layer is completely etched through.

Another approach to etching end point detection requires monitoring the visible light emitted by a plasma at a predetermined wavelength, such as a characteristic emission line for the etched material or its compounds. Etching is terminated when the intensity of the characteristic emission line is reduced, indicating the absence or reduced concentration of the etched material, or increased abundance of reactants, or presence of new reactants whose source is the layer beneath the layer of material being monitored.

A third technique for end point detection uses a laser interferometer and attempts to directly monitor the present depth of the layer being etched or grown. This method has some associated ambiguities in determination of the depth, because several different depths of the material of interest may produce the same interferometric signal, as noted by M. Born and E. Wolf in "Principles of Optics", Pergamon Press, 5th Edition, 1975, p. 62.

Maydan et al., in U.S. Pat. No. 4,618,262, discloses the use of a laser interferometer system to detect the end point of an etch process and to monitor the present depth of a layer undergoing etching or growth. This process requires that the laser beam first be scanned across scribe lines on a wafer that is undergoing fabrication, locating an appropriate region adjacent to or within a scribe line, and monitoring the interferometric signal produced when the laser is directed at and allowed to reflect from that area on the wafer surface. The Maydan et al. invention monitors the interference pattern of repetitive maxima and minima produced in an interference pattern and requires that the laser beam be focused on a region of the semiconductor surface where optically degrading structural features, such as trenches and other sharp changes in the side profile of a semiconductor wafer or chip, are absent.

An interferometric system for measuring both etch rate and etch depth of a semiconductor body is disclosed by Muething in U.S. Pat. No. 4,660,979, issued on "Method and Apparatus for Automatically Measuring Semiconductor Process Parameters." The interferometer directs light toward the semiconductor body and detects the intensity of reflected light; this intensity will vary periodically during the etching process. A counter circuit responds to the periodically varying intensity of the reflected light and determines the number of cycles and the present frequency of variation thereof to compute present etch rate and etch depth in the semiconductor body.

The "Interferometric Methods and Apparatus for Device Fabrication" disclosed by Heimann et al. in U.S. Pat. No. 4,680,084 monitors etch depth by monitoring the intensity of monochromatic light reflected from the active surface of the body being etched. The wavelength of light used for reflection is chosen so that a first, exposed overlying portion of the semiconductor body is substantially transparent at that wavelength and an underlying portion of the semiconductor body which is not to be etched, is substantially opaque at that wavelength.

Several problems are manifest in one or more of the approaches in the prior art. First, scanning of the wafer surface is required, which requires special apparatus and use of a criterion that determines whether a suitable measurement location, such as a scribe line, is available. This requires complex analysis of the surface reflection signal, and the completion of the entire procedure can consume a considerable period of time. Second, measurement of both thick and thin films with the same process is difficult or impossible because of the assumptions often made in the thickness analysis. Third, access to a suitable spot, such as a scribe line or exposed portion of the surface whose growth or removal is to be monitored, is not guaranteed. If no suitable spot is found, another approach must be sought and used for monitoring that particular growth or removal process. Thus, different monitoring techniques might be required for monitoring different stages of the fabrication process.

What is needed is an optical monitoring system that determines changes in thickness of a layer of semiconductor or other material that is being etched or grown, as a function of time, which is not subject to ambiguities in the optical parameters thereby determined and that does not require scanning of the light beam across scribe lines or other features of the material surface.

SUMMARY OF THE INVENTION

This need is met by an optical measurement method that operates through an aperture in masking material overlying a layer of material, before etching or growth of the layer. The method identifies repeated maxima, minima or other criteria in an optical signal as the thickness of underlying material changes relative to a reflective surface. This method allows an unambiguous determination of changes in thickness of the monitored layer at a sequence of times during etching or growth of the layer.

The present invention provides a method of monitoring changes in the thickness of a thick or thin layer of semiconductor or other material that is undergoing etching or growth. Changes in thickness of the changing layer, rather than an absolute depth determination, are determined reflectively. The method is straightforward and mechanically simple. No surface scanning is required.

BRIEF DESCRIPTION OF THE DRAWINGS

FIG. 1 is a schematic view demonstrating formation of an aperture in mask material that overlies the layer of semiconductor material to be monitored, according to the invention.

FIG. 2 is a schematic view illustrating use of an interferometric technique according to the invention.

FIG. 3 is a graphical view of a representative interferometric signal, expressed as a function of time, that is received and processed in the present invention. This illustrates several pairs of corresponding values of the interferometric signal.

FIG. 4 is a schematic view illustrating one means of delivery of a light beam to the target spot for aperture formation according to the invention.

BEST MODE FOR CARRYING OUT THE INVENTION

With reference to FIG. 1, consider a semiconductor structure that comprises a layer 11 of photoresist or other masking material that overlies and is contiguous to a second layer 13 of material that is to be etched wherever this second layer 13 is exposed and not covered by the masking material. The second layer 13 is assumed to overlie and be contiguous to a third layer 15, such as a semiconductor substrate, which differs from the material of the second layer 13 and is not to be etched. It is preferable that the particular region of the semiconductor structure illustrated in FIG. 1 is spaced apart from any portions of a circuit or other operating device that is part of the semiconductor structure, although it may also be provided proximate active devices of the semiconductor wafer.

An aperture 17, preferably of predetermined diameter D, is provided in the layer 11 of masking material in order to expose the upper surface of the second layer 13. The aperture 17 may be formed by directing a laser beam of optical fluence typically >0.1 Watts/cm$^2$ of appropriate wavelength on the region of masking material 11 so that this cylinder of masking material is ablated (i.e. burned away), photochemically etched or otherwise removed from the first layer 11 in order to expose the upper surface of the second layer 13. In the case of photochemical etching, the laser beam spot activates an etchant gas to remove the material of layer 11 at aperture 17, while the surrounding layer 11 is substantially unaffected by the etchant gas. The laser wavelength $\lambda_2$ may be chosen so that radiation of this wavelength is largely reflected by the second layer 13 of semiconductor material so that little or no material from this second layer 13 is removed in this aperture formation process. The laser wavelength $\lambda_2$ may be chosen for high chemical selectivity so that radiation of wavelength $\lambda_2$ induces or promotes ablation, chemical etching or other removal of the first layer 11 of material but does not do so for the second layer 13 of material. Other means of providing the aperture may also be used.

An interrogating laser (not shown in FIG. 1) or other source of highly monochromatic light of wavelength $\lambda_1$ of optical fluence <0.2 Watt/cm$^2$ is now directed through the aperture 17 at the exposed upper surface of the second layer 13 at a predetermined incidence angle $\theta_1$, as illustrated in FIG. 2, and the reflected interferometric signal is monitored by a monitoring module 19 that is positioned to receive light beam rays that leave the upper surface of the layer 13 with a reflected angle of $\theta_1$. Formation of the aperture 17 should be done before the etching process begins, but monitoring of the reflected interferometric signal may begin before, at the time of, or after the etching process for the second layer 13 begins. For example, the interrogating laser may also be used to monitor the remaining thickness of the masking material in the first layer 11 that is removed to form the aperture 17 therein. It is assumed here that the portion of the second layer 13 exposed by the aperture 17 will undergo etching at approximately the same rate at which etching of the exposed second layer 13 proceeds elsewhere. The diameter D of the aperture 17 is preferably sufficiently large that, at the chosen incidence angle $\theta_1$ for the light beam, the portion of the light beam that enters the second layer 13 of material undergoes several reflections at each of the interfaces between first and second layers and between second and third layers, and portions of these reflections emerge as refracted beams that leave the exposed surface of the second layer 13 within the aperture 17 at the angle of reflection $\theta_1$. This will insure that the interferometric monitoring module 19 will receive several components of these reflected and refracted beams as illustrated in FIG. 2 to provide a high signal-to-noise ratio. It is also assumed here that the upper surface of the layer 13 that is exposed by the aperture 17 is substantially planar, that the interface between the second layer 13 and the third layer 15 shown in FIG. 2 is substantially planar, and that these two planes are approximately parallel to one another.

The wavelength $\lambda_1$ of the interrogating laser is preferably chosen so that the material comprising the second layer 13 is at least partially transparent to light at the wavelength $\lambda_1$. However, this approach may be used where the second layer 13 is composed of a metal and other opaque material, such as aluminum.

with reference to FIG. 2, a light beam 21 of wavelength $\lambda_1$ is incident on the exposed surface 13S of the second layer 13 within the aperture 17 at an incidence angle of $\theta_1$. A portion of this light beam 21 is reflected in a first component 21r at a reflection angle $\theta_1$, and a second component 21t of the light beam 21 is transmitted into the second layer 13 of material at a refracted angle $\theta_2$ in a well-known manner.

A portion of the transmitted component 21t is transmitted into the third layer 15 of material and produces a component 21tt as shown; another portion is reflected as a reflected component 21tr; and a portion of this latter reflected component is transmitted at the first layer-second layer interface 13S to produce a component 21trt that moves away from this interface in a direction parallel to the original reflected component 21r. In a similar manner, additional reflected components 21trrrt, 21trrrrrt, etc. are produced and move away from the interface 13S parallel to the original reflected component 21r. Reflection from interface 15S produces an interferometric total reflected intensity signal R that varies approximately periodically with change in the thickness $h_2$ of the second layer 13 and depends on the light beam wavelength $\lambda_1$, the refractive index of the second layer 13, and on the refraction angle $\theta_2$ of the light beam in the second layer 13. The angles $\theta_1$, $\theta_2$ and $\theta_3$ shown in FIG. 2 are related by Snell's law in a well-known manner.

FIG. 3 illustrates the variation of the reflection intensity signal R with thickness $h_2$ of the second layer 13. If the thickness $h_2$ is increasing with time, through growth or deposition, or is decreasing in time, through etching or other removal, the signal R will vary with time through the dependence of $h_2$ on time. As the thickness $h_2$ passes through certain values $h_2=h_{2i,M}$ ($i=1, 2, \ldots, N_1$) the signal R will reach a local maximum $R_{max}$ at a point 24 and will then decrease. As the thickness $h_2$ passes through certain values $h_2=h_{2j,m}$ ($j=1, 2, \ldots, N_2$) the signal R will reach a local minimum $R_{min}$ at a point 26 and will then increase, as indicated in FIG. 3. The set $\{h_{2i,M}\}_i$ of local maxima of layer thickness form a set of local extrema; and the set $\{h_{2j,m}\}_j$ of local minima of layer thickness form a separate set of local extrema. Two consecutive values of the thicknesses $h_{2i,M}$ are spaced apart approximately by the distance $$\Delta h_{2,M} = h_{2(i+1),M} - h_{2i,M} = \quad (1)$$

$$\frac{\lambda_1}{2n_2} \sec\left[\sin^{-1}\left(\frac{n_1 \sin\theta_1}{n_2}\right)\right] \cong \frac{\lambda_1}{2n_2} \text{ (for small } \theta_1\text{),}$$

where $\sec[x]$ denotes the secant of the angle x, and $n_1$ and $n_2$ are the refractive indices at wavelength $\lambda_1$ of the ambient medium, such as air or a very low pressure gas, and the second layer 13 of material, respectively. Two consecutive values of the thicknesses $h_{2j,m}$ are spaced apart approximately by the same distance $$\Delta h_{2,m} = h_{2(j+1),m} - h_{2j,m} = \quad (2)$$

$$\frac{\lambda_1}{2n_2} \sec\left[\sin^{-1}\left(\frac{n_1 \sin\theta_1}{n_2}\right)\right] \cong \frac{\lambda_1}{2n_2} \text{ (for small } \theta_1\text{).}$$

If two consecutive members of the "maximum" set $\{h_{2k,M}\}_k$ of thicknesses, or two consecutive members of the "minimum" set $\{h_{2j,m}\}k$ of thicknesses, occur at times $t=t_k$ and $t=t_{k+1}(>t_k)$, the average etch or growth rate $v_k$ for the time interval $t_k<t<t_{k+1}$ is given by $$v_k = \frac{\Delta h_2}{t_{k+1} - t_k}, \quad (3)$$

where $\Delta h_2$ is the quantity $\Delta h_{2,M}$ or $\Delta h_{2,m}$ determined above. The total thickness H of material grown or etched in moving to the nth consecutive thickness in the maximum set or minimum set of thicknesses is then $$H = \Delta h_0 + \sum_{k=1}^{n} v_k(t_{k+1} - t_k), \quad (4)$$

where $\Delta h_0$ is the thickness of the second layer 13 that is removed or grown to reach the first thickness $h_{21,M}$ or $h_{21,m}$ in the maximum or minimum set of thicknesses, respectively.

The end point of the etch process corresponds to $h_2=0$, where all of the second layer 13 has been consumed by the etchant. The end point of the growth process is determined by the desired thickness $h_2$ of the layer to be grown. The etch process can be terminated or modified at any desired etch length H or at the end point, as desired. For example, the average etch rate $V_k$ may be changed at a predetermined depth of the layer 13 in order to provide higher selectivity to the material in the layer 15 when the layer 15 is exposed.

The reflectivity parameter R can be graphically displayed on the screen of a display module as a function of time so that the sequence of times at which R attains a local extremum value, a maximum or minimum, is easily identified from the display. The display module could also compute the average rate of change v of thickness of the second layer and display the numerical value of v and H, determined from Equations (3) and (4).

In one embodiment for determination of etch rate or total thickness consumed thus far by the etchant or of growth rate, an aperture 17 is first provided in the masking material as indicated in FIG. 1. A laser beam or other monochromatic light beam 21 of predetermined wavelength is then directed at a small portion of the upper surface of the first layer 13 of material that is exposed by the aperture 17, and a series of reflected images of the light beam are generated as indicated in FIG. 2. An interferometric monitoring module 19 is then positioned to receive these reflected images and to provide a graphical or numerical output indicating the present value of the reflectivity parameter R as a function of time. The increments $\Delta h_2$ of thickness of the first layer 13 that relate to two consecutive members of a maximum or minimum of thicknesses set, as illustrated in FIG. 3, is determined by the Equations (1) or (2). The average etch rate within a time interval defined by $t_i<t<t_{i+1}$ is given by Equation (3), and the total thickness of the second layer 13 consumed thus far is given by the Equation (4). The values of the reflectivity parameter R may be displayed graphically or numerically by the module 19.

If a laser beam is used to form the aperture 17 in FIG. 2, the laser fluence should be sufficiently high to allow easy ablation of the overlying masking material; fluences of at least 0.1 Watts/cm² are typically used for general ablation. This laser beam may be produced by an excimer laser such as Ar, Xe or Kr; or the laser beam may be produced by a rare gas halide laser that utilizes a gas such as ArCl, XeCl, ArF, KrF or other similar compounds. Each of these lasers produces laser radiation in the ultraviolet or low visible region (wavelength $\lambda<4000$ Å). A laser that produces visible or near-infrared wavelengths, such as HeNe or a diode laser, may also be used here.

The laser beam used to form the aperture 17 could be delivered to the target spot on the masking material by a fiber optics cable or other means, as illustrated in FIG. 4. An excimer laser radiation source 23 produces an excimar laser beam of wavelength $\lambda_2$ that is transported by one or more optical fibers 25 to a region adjacent to the intended aperture 17 in the first layer 13 of material; and focusing optics 27 focus and direct this laser beam to produce the aperture 17 in the first layer 13. A Q switch, including material such as lithium niobate, may be provided adjacent to or within the excimer laser radiation source 23 to controllably release laser radiation onto the fiber 25. A laser radiation source 29 produces an interrogation radiation beam 21 of wavelength $\lambda_1$, and this beam is directed into the aperture 17 produced by the excimer laser beam through a window 31 in a chamber 33 that contains the wafer being monitored. The chamber 33 may be provided with a gas outlet 35 to remove gas and produce a vacuum of selected level and with a gas inlet 37 to introduce a selected gas into the chamber 33. Additional optical fibers 26a, 26b, 26c may be used to transport the excimer laser radiation produced by the source 23 to other chambers.

Alternatively, the laser beam of wavelength $\lambda_2$ could be delivered to and focused on the target spot on the masking material by conventional mirrors and other optical components. In order to form the aperture 17 shown in FIG. 1, this laser beam or other light beam may be pulsed at an appropriate rate such as 100–10,000 Hz. Masking materials for which an aperture can be formed therein include positive and negative photoresist, oxides of silicon, polysilicon, and layers of metal such as Al, Ag, Au, W and Ti and of silicides.

This interferometry technique may also be used for measuring the rate of growth of or deposition on an exposed layer of semiconductor material. Further, the technique may be used to measure the changing thickness of any material, not restricted to semiconductor material, which is substantially transparent to light at some wavelength.

The wavelength of the laser beam can often be chosen so that the ablation or other aperture formation process is chemically selective and occurs only in the masking material, not in the underlying semiconductor material. Many masking materials are highly absorbent to electromagnetic radiation at ultraviolet wavelengths. If the underlying material has a "window" or limited range of ultraviolet wavelengths at which light absorption by the material is relatively small, use of a laser beam with a wavelength in that limited range will promote selectivity. In this circumstance, the thickness detection apparatus would be turned off during aperture formation.

A single light source might be used to provide the aperture 17 in the first layer 11 of material and to provide the monitoring beam for interferometrically measuring thickness change in the second layer 13. This may be accomplished by choosing a single wavelength $\lambda_3$ that can serve both for aperture formation and for thickness monitoring. This may also be accomplished by providing a single light source whose radiative output can be switched between two different wavelengths $\lambda_1$ and $\lambda_2$. An example of a light source that is capable of alternatingly producing light of two different wavelengths is the dual frequency optical cavity disclosed by George et al. in U.S. Pat. No. 4,510,605, which is incorporated by reference herein. Other examples of apparatus that produces radiation of two or more wavelengths in an alternating manner are disclosed in U.S. Pat. No. 4,573,465, issued to Sugiyama et al., U.S. Pat. No. 4,637,027, issued to Shirasaki et al., U.S. Pat. No. 4,660,205, issued to Harter et al., U.S. Pat. No. 4,747,110, issued to Takahashi et al., and U.S. Pat. No. 4,751,706, issued to Rohde et al., also incorporated herein by reference. Many techniques are available for production of light at two spaced apart wavelengths by a single source. Thus, a single light source can be multiplexed between two wavelengths to drive the aperture-forming and thickness monitoring processes discussed here.

A second layer 13 of material that is opaque or approximately 100 percent reflecting to the radiation of wavelength $\lambda_1$ may also be used here. No substantial variation in interferometric signal R would be detected because all incident radiation either would be fully reflected at the first layer-second layer interface 13S or would be fully absorbed in the second layer 13. However, the reflectivity signal R from the interface 13S will change markedly at the end of an etch process, as the second layer 13 is fully consumed and the third layer 15 is exposed; and this change in reflected signal may be used to determine the end point of the etch process in the second layer.

The radiation of wavelength $\lambda_2$ may also be used to promote etching action or growth action at the exposed interface 13S of the second layer 13 by providing additional thermal energy, in the form of radiation photons delivered, sufficient to activate or maintain the etch or growth process.

For example, if an oxide to be etched has a dissociation energy of, say, 4.9 eV, a KrF laser that produces radiation of wavelength $\lambda$=2490 Å (photon energy=4.98 eV) would be appropriate to promote etching action. Excimer lasers and rare gas halide lasers are available to produce and deliver photon energies up to at least 7.2 eV so that etching of most semiconductor and semiconductor oxide materials can be promoted using such lasers.

If the combination of masking material and underlying semiconductor material do not permit choice of a wavelength for aperture formation that is chemically selective, the thickness detection apparatus may be used to monitor the thickness of the masking material as this material is ablated or otherwise by the laser beam, using another laser or light source with a visible or infrared wavelength to sense the changes in thickness in the remaining layer 11 of the ablating masking material by the technique disclosed above. Alternatively, the chemical composition of the ablated material can be analyzed spectroscopically or otherwise in real time as the ablation process proceeds; and when the ablation products that are characteristic of the masking material abruptly decrease in quantity, the ablation process is terminated and etching of the semiconductor layer or growth of a new layer may begin.

Table 1 lists various masking materials and underlying layer materials for which the invention may be used to monitor the change in thickness of the underlying layer. Listing of particular materials in the Table is not intended to foreclose use of other materials.

TABLE 1

Suitable Mask and Etch Layer Material Combinations.

| Masking Material | Etch Layer Materials |
|---|---|
| photoresist | silicon, polysilicon, silicides, nitrides, oxynitrides, oxides, Al, Ti, Cu, W, Cr, TiN, TiW, GaAs, InP, PSG, BPSG |
| oxide | polysilicon, silicides, nitrides, Al, Ti, Cu, W, Cr, TiN, TiW, GaAs, photoresist |
| polysilicon | oxides, PSG, BPSG |
| Al | oxides, PSG, BPSG, photoresist |

I claim:

1. A method for determining the rate of change of thickness in a first thin planar layer of a first material having a refractive index $n_2$ at a predetermined wavelength $\lambda_1$ and being at least partly transparent to light at the wavelength $\lambda_1$, fabricated on a second layer of a different material, where the first layer is positioned between and has an interface with each of the second layer and a third layer of material that overlies the first layer, and where it is intended that the thickness of the first layer will be decreasing with time or increasing with time, the method comprising the steps of:

providing a planar substrate with said second, first, and third planar layers thereon;

creating an aperture through the third layer of material so that a portion of the first layer is exposed;

directing a light beam including a component of wavelength $\lambda_1$ into the aperture to illuminate the exposed first layer at a predetermined incidence angle $\theta_1$ such that a portion of the light beam is reflected at the surface of the exposed first layer and at the first layer-second layer interface;

performing an interferometry intensity measurement of light beam reflectivity R at each of a sequence of consecutive times $\{t_i\}_{i=1}^N$ at which the reflectivity attains a local extremum, with $t_1<t_2<...<t_N$;

determining the average rate of change $v_i$ of thickness of the first layer in a time interval $t_i<t<t_{i+1}$ (i=1,2, ... ,N−1) by use of the relation $$v_i=\lambda_1/2n_2(t_{i+1}-t_i).$$

2. The method of claim 1, further comprising the step of choosing two local extrema of R as two maximum values of R.

3. The method of claim 1, further comprising the step of choosing two local extrema of R as two minimum values of R.

4. The method of claim 1, further comprising the steps of:

introducing an etchant gas that is reactive with said third layer of material; and creating said aperture by a photochemical reaction between a second light beam, the etchant gas, and the third layer of material.

5. A method for determining the rate of change of thickness in a first thin planar layer of a first material having a refractive index $n_2$ at a predetermined wavelength $\lambda_1$, in an ambient medium with a refractive index $n_1$, and being at least partly transparent to light at the wavelength $\lambda_1$, fabricated on a second layer of a different material, where the first layer is positioned between and has an interface with each of the second layer and a third layer of material that overlies the first layer, and where it is intended that the thickness of the first layer will be decreasing with time or increasing with time, the method comprising the steps of:

providing a planar substrate with said second, first, and third planar layers thereon;

creating an aperture through the third layer of material so that a portion of the first layer is exposed;

directing a light beam including a component of wavelength $\lambda_1$ into the aperture to illuminate the exposed first layer at a predetermined incidence angle $\theta_1$ such that a portion of the light beam is reflected at the surface of the exposed first layer and at the first layer-second layer interface;

performing an interferometry intensity measurement of light beam reflectivity R at each of a sequence of consecutive times $\{t_i\}_{i=1}^N$ at which the reflectivity attains a local extremum, with $t_1<t_2<...<t_N$;

determining the average rate of change $v_i$ of thickness of the first layer in a time interval $t_i<t<t_{i+1}$ (i=1,2, ... ,N−1) by use of the relation $$v_i=\lambda_1 \sec[\sin^{-1}(n_1 \sin \theta_1/n_2)]/2n_2 \, (t_{i+1}-t_i).$$

* * * * *